United States Patent
Illium et al.

(10) Patent No.: US 9,764,683 B2
(45) Date of Patent: Sep. 19, 2017

(54) VEHICLE HEADLAMP DEVICE HAVING AT LEAST ONE REGION IN ITS MAIN BEAM DISRIBUTION BEING SELECTIVELY SUPPRESSED BY DEACTIVATING LIGHT SOURCE

(71) Applicant: GM GLOBAL TECHNOLOGY OPERATIONS LLC, Detroit, MI (US)

(72) Inventors: Justus Illium, Ruesselsheim (DE); Thomas Feid, Ruesselsheim (DE); Rouven Haberkorn, Ruesselsheim (DE); Ingolf Schneider, Ruesselsheim (DE); Michael Bang, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/258,429

(22) Filed: Sep. 7, 2016

(65) Prior Publication Data

US 2017/0066367 A1    Mar. 9, 2017

(30) Foreign Application Priority Data

Sep. 7, 2015 (DE) .................. 10 2015 011 623

(51) Int. Cl.
*B60Q 1/02* (2006.01)
*B60Q 1/14* (2006.01)
(Continued)

(52) U.S. Cl.
CPC ............. *B60Q 1/1423* (2013.01); *B60Q 1/16* (2013.01); *H05B 33/0854* (2013.01);
(Continued)

(58) Field of Classification Search
CPC ........ B60Q 1/1423; B60Q 1/143; B60Q 1/08; B60Q 1/085
(Continued)

(56) References Cited

U.S. PATENT DOCUMENTS 7,824,086 B2     11/2010  Yamamura et al.
8,870,424 B2 *   10/2014  Tatara ................ B60Q 1/12
                                                           315/81
(Continued)

FOREIGN PATENT DOCUMENTS

DE    102012008833 A1    11/2012
DE    102014216545 A1     2/2016

OTHER PUBLICATIONS

German Patent Office, German Search Report for German Application No. 102015011623.1, dated May 11, 2016.

*Primary Examiner* — Thuy Vinh Tran
(74) *Attorney, Agent, or Firm* — Lorenz & Kopf LLP (57) ABSTRACT

A headlamp device for a motor vehicle includes a segmented light source, which has individually deactivatable light source segments for generating a glare-free main beam with the aid of an automatic dimming system. The headlamp device is configured such that one or more regions in the main beam distribution of the headlamp device can be suppressed selectively by deactivating individual light source segments. Each light source segment in the activated state lights up a main beam segment region with a respectively preset width in the main beam distribution of the headlamp. The width of the main beam segment region is preset in the main beam segment region depending on an expected average dynamic of objects to avoid dazzling under normal traffic conditions.

18 Claims, 8 Drawing Sheets

(51) Int. Cl.
*B60Q 1/16* (2006.01)
*H05B 33/08* (2006.01)
*H05B 37/02* (2006.01)

(52) U.S. Cl.
CPC ... *H05B 37/0227* (2013.01); *B60Q 2300/056* (2013.01); *B60Q 2300/42* (2013.01)

(58) Field of Classification Search
USPC .................................. 315/82; 362/465, 466
See application file for complete search history.

(56) References Cited

U.S. PATENT DOCUMENTS

| | | | |
|---|---|---|---|
| 8,979,336 B2 | 3/2015 | Yamamura | |
| 9,227,553 B2* | 1/2016 | Nordbruch | B60Q 1/085 |
| 2006/0023461 A1* | 2/2006 | Knight | B60Q 1/076 |
| | | | 362/466 |
| 2013/0010485 A1* | 1/2013 | Sikkens | B60Q 1/122 |
| | | | 362/465 |

* cited by examiner

VEHICLE HEADLAMP DEVICE HAVING AT LEAST ONE REGION IN ITS MAIN BEAM DISRIBUTION BEING SELECTIVELY SUPPRESSED BY DEACTIVATING LIGHT SOURCE

CROSS-REFERENCE TO RELATED APPLICATION

This application claims priority to German Patent Application No. 102015011623.1, filed Sep. 7, 2015, which is incorporated herein by reference in its entirety.

TECHNICAL FIELD

The present disclosure pertains to a headlamp device for a motor vehicle.

BACKGROUND

More and more headlamp systems on motor vehicles include headlamp devices that can be controlled by special controllers to ensure not only that a driver of the motor vehicle is able to see the road he or she is driving on and relevant objects as early as possible, but also to avoid dazzling other road users. Thus for example, an automatic dimming system dips the main beam selectively in certain areas of the main beam distribution to protect other road users from glare. The suppression of certain areas in the main beam distribution by the automated system is known for example as GFHB (Glare-Free-High-Beam), automated GFHB or ADB (Adaptive Driving Beam).

Headlamp systems are known in which measures to avoid dazzling road users involve mechanically movable parts such as screens or headlamps that can swivel horizontally. However the precision and reliability of such systems can be impaired by wear and the production tolerances of mechanical parts.

In headlamp systems that contain no mechanically moving parts, the suppression of certain areas of the main beam distribution cannot be controlled with unlimited spatial resolution. Instead, the main beam that is controlled by automatic GFHB in such systems is segmented. Because in dimmed mode certain segments with finite width are suppressed in the main beam distribution.

One of the consequences of this is that in general larger areas of the main beam distribution are suppressed than would be necessary to avoid dazzling the road users. Moreover, this segmentation of the main beam distribution is perceived from the driver's perspective as a distracting grid effect in the main beam distribution which detracts from driving comfort in addition to other drawbacks.

SUMMARY

The present disclosure provides an inexpensive headlamp device with which it is possible to reduce the negative effects listed above without reducing the overall performance of the headlamp system. According to a first aspect of the present disclosure, a headlamp device of a motor vehicle is equipped with a segmented light source, which has individually deactivatable light source segments for generating a glare-free main beam with the aid of an automatic dimming system and that are configured such that one or more regions in the main beam distribution of the headlamp device can be suppressed selectively by deactivating individual light source segments. Each light source segment in the activated state lights up a main beam segment region with a respectively preset width in the main beam distribution of the headlamp. In this arrangement, the width of the main beam segment region is preset in the main beam segment region depending on an expected average dynamic of objects to avoid dazzling under normal traffic conditions.

The width of a main beam segment region in the main beam distribution may be referenced on a spatial angle within a light cone of the total main beam distribution which is created when all light source segments of the headlamp device are activated. Alternately, it may also be referenced on a projection surface set vertically at a predefined distance in front of the headlamp device. The notes here apply for both definitions, provided one of the two definitions of the width is used consistently.

The term expected average dynamic of objects to avoid dazzling is understood to mean the movement behavior over time of objects for which glare is to be avoided—such as oncoming traffic or traffic ahead travelling in the same direction—relative to the reference motor vehicle in actual road or motorway traffic.

The present disclosure is based on the realization that the dynamic of road users or objects to avoid dazzling is not observed to be the same in all main beam segment regions of the main beam distribution, and consequently the perceptibility of the grid effect caused by the segmentation of the light source or the main beam distribution is different in different regions of the main beam distribution. In the regions where the grid effect is more perceptible, a correspondingly finer segmentation of the main beam distribution is provided by narrower main beam segment regions. By providing main beam segment regions with differing degrees of perceptibility in different parts of the main beam distribution, the distracting grid effects can be suppressed efficiently and selectively in sensitive areas.

As a result, improved performance and greater comfort for the driver are achieved for comparable manufacturing costs and comparable headlamp configurations. By considering the actual traffic situation in the dimensioning of the main beam segment regions, it is also possible to achieve a more harmonious dynamic behavior of the headlamp which in turn further increases driving comfort.

In one embodiment of the present disclosure, the headlamp device is designed such that the main beam segment regions in which a greater dynamic of objects to avoid dazzling is to be expected under actual traffic conditions from the perspective of the motor vehicle driver are wider on average than the main beam segment regions in which a lower dynamic of objects to avoid dazzling is to be expected under actual traffic conditions from the perspective of the motor vehicle driver. In this context, the greater or lower dynamic of objects to avoid dazzling means that the objects to be protected from glare are moving with a greater or lesser angular speed relative to the motor vehicle driver. As a result of the high dynamic, that is to say the high angular speed of the objects, the coarse grid effect becomes less noticeable to the driver in the corresponding parts of the main beam distribution. Accordingly, a spatial or angular resolution of the main beam distribution that is low relative to other regions would be sufficient in these regions, so the cost of manufacturing headlamps with comparable performance may be optimized.

For example, this enables headlamp devices to be configured for optimum cost and performance in terms of light source segments, in which a more refined segment structure is provided in those parts of the headlamp where the grid effect in GFHB mode is more noticeable under normal traffic conditions, and a coarser structure is provided in the parts where the grid effect in GFHB mode is less noticeable under normal traffic conditions. In the countries in which traffic drives on the right, for example, a high road user dynamic is usually observed on the left side, so that coarser grid effect of the main beam distribution would be less noticeable on the left side than in the middle, for example, where traffic in front of the vehicle and moving in the same direction displays a much lower dynamic.

On the right side of the illumination field, the availability of the main beam is largely unrestricted over the whole of the maximum possible width, and the dynamic of objects to avoid dazzling is also considerably lower on the right side than on the left side. The main beam in the middle region is suppressed in GFHB mode to avoid glare in the mirrors of vehicles ahead and travelling in the same direction. Since the relative speed of the vehicles ahead and travelling in the same direction is considerably lower than the relative speed of oncoming traffic, particularly with regard to angular speed from the perspective of the driver, the dynamic of objects to avoid dazzling in the middle is considerably lower.

According to one embodiment of the present disclosure, the headlamp device includes a first headlamp with a main beam segmentation inclined towards the oncoming carriageway, and a second headlamp inclined away from the oncoming carriageway with a second main beam segmentation asymmetrical with the first main beam segmentation.

According to one embodiment of the present disclosure, the headlamp device includes a first headlamp inclined towards the oncoming carriageway and having a first light source segmentation and a first main beam segmentation, and a second headlamp inclined away from the oncoming carriageway having a second light source segmentation and a second main beam segmentation directed asymmetrically with respect to the first light source segmentation.

In one embodiment, the headlamp device is configured such that when all headlamp segments of both headlamps are activated a main beam distribution is created that is substantially mirror-symmetrical about a middle axis. When a vertical test surface is illuminated with a mirror-symmetrical main beam of such kind, an illuminated surface is created with contours that are substantially mirror-symmetrical about a middle axis or axis of symmetry. The symmetrical main beam distribution ensures that on roads with no traffic the driver is provided with equal light distribution on both sides from the middle of the carriageway, affording him equally good distant visibility on both sides.

According to one embodiment of the present disclosure, the main beam distribution to the half that is directed away from the oncoming carriageway has more main beam segment regions than on the half that is directed at the oncoming carriageway. In this way, a greater spatial resolution of the main beam distribution is provided on that side of the main beam distribution where the need thereof is greater—that is to say on the right side in traffic driving on the right.

According to one embodiment of the present disclosure, the main beam distribution has a first outer region directed at the oncoming carriageway, a second outer region directed away from the oncoming carriageway and a middle region, wherein the main beam in the middle region of the main beam distribution is produced substantially by the first headlamp. In traffic driving on the right, for example, the result of this would be that the left headlamp lights to the right more intensely and thus "assists" the right side, where the main beam is needed in better quality, that is to say with a finer segmentation because the grid effect is more noticeable.

In one embodiment of the present disclosure, the headlamp that is angled away from the oncoming carriageway has more light source segments than the headlamp that is angled toward the oncoming carriageway. Increasing the number of light source segments provides a simple way to provide finer spatial resolution for the side of the main beam distribution where it is more needed—that is to say in on the right side and in the middle in right-driving traffic.

Alternatively, the number of light source segments may be left unchanged in the headlamp that is angled away from the oncoming carriageway, and reduce the number in the headlamp that is angled toward the oncoming carriageway. In this way, the costs of producing the headlamp device may be reduced without any significant loss of performance.

According to one embodiment of the present disclosure, the first headlamp and the second headlamp have the same number of light source segments.

In one embodiment, both headlamps are designed such that in the installed state when viewed from the front they present a substantially mirror-symmetrical construction about a center line extending vertically between the headlamps.

In one embodiment of the present disclosure, at least one of the two headlamps has a dummy light source segment, which from the outside looks like a deactivated light source segment. The light source segment is thus not noticeable among deactivated light source segments. In this way, the asymmetrical main beam distribution may be created simply without detracting from the appearance of the vehicle. Moreover, such a headlamp device may easily be reconfigured for a market with traffic driving on the left or right by replacing a dummy light source segment with a fully functional light source segment, or conversely by replacing a fully functional light source segment with a dummy light source segment. In one embodiment of the present disclosure, the wider main beam segment areas are located substantially in outer regions of the main beam distribution. In the outer regions of the main beam distribution the grid effects are less noticeable, and it is therefore not necessary to implement fine grid effects in these regions.

According to one embodiment of the present disclosure, the headlamp device is designed such that the adjacent main beam segment regions at least partly overlap each other. This overlapping of adjacent main beam segment regions serves to smooth the main beam distribution and reduce the effects of any production-induced tolerances in the adjacent light source segments.

In one embodiment of the present disclosure, the headlamp device is designed such that the light source segments can be deactivated by switching them off or dimming them to below a lighting threshold. In this context, deactivating a light source segment means that the light intensity of the main beam emitted from the corresponding light source segment is not sufficient to dazzle road users.

According to one embodiment of the headlamp device, light source segments are equipped with semiconductor light sources, particularly LEDs or semiconductor lasers. Semiconductor light sources are notable for their long service life and high efficiency. The use of semiconductor lasers may also serve to improve the light quality and light intensity of the main beam.

According to one embodiment of the present disclosure, the headlamp device is in the form of a LED matrix headlamp device. wherein the light source segments are realized as LED matrix elements, particularly as LED matrix segments. The use of LED matrix headlamps provides a simple way to partially suppress certain positions of the main beam without mechanical screens. In this context, certain main beam segment regions may be suppressed without deactivating certain LED matrix segments, to obtain the desired main beam distribution suppression. The LED matrix elements may be in the form of individually actuatable LED modules. In particular, narrower LED matrix segments may have the form of individual LED modules and/or LED cluster modules, wherein the LED modules include high performance individual LED modules and/or LED cluster modules preferably mounted on a ceramic or metal core board.

According to a further aspect of the present disclosure, a motor vehicle is described that is equipped with a headlamp device according to the first aspect of the present disclosure, wherein a sensor device with at least one environmental sensor is provided to capture a current driving situation, and a control unit is designed to suppress the main beam selectively in response to the driving situation, particularly when a risk of dazzling other road users is detected. In one embodiment, the motor vehicle is equipped with an environmental sensor that is arranged in a front area of the motor vehicle. In one embodiment, the environmental sensor is designed as an optical sensor. In this context the optical sensor is preferably arranged in a front area of the motor vehicle. This makes it possible to ensure that the optical sensor's field of view coincides at least with sections of the light cone of the motor vehicle headlamps, which serve to light the road on which the motor vehicle is travelling.

According to one embodiment the optical sensor is a camera, and camera systems integrated in usual motor vehicles are known, to deliver data for many driver assistance systems, for example, so that the function thereof can be used with the need for complicated, expensive conversions. For example, the optical sensors may be a part of a blind spot monitoring arrangement, for observing other vehicles that are overtaking or in a neighboring lane, wherein the sensors may consist of at least one camera in the rearview mirror or arranged close to the motor vehicle's rearview mirror.

According to a further embodiment, the optical sensor is a radar system. The term radar is generally understood to denote locating devices based on electromagnetic waves in the radio frequency range outside the visible spectrum. Accordingly, radar is particularly suitable for detecting motor vehicles that may be overtaking on poorly lit roads. Radar systems also known components of many driver assistance systems, for example to assist a driver in traffic, when changing lanes, for example, so that the function thereof can be used with the need for complicated, expensive conversions.

The optical sensor may also be a lidar system. The basic function of a lidar system consists in measuring distances. The instrument emits laser pulses and detects the light that is scattered back from an object. An object can be detected and particularly the distance to the object can be calculated using the time the signals take to return and the speed of light. In this way, the returning light of the laser from the surface of the object enables conclusions to be drawing regarding the speed and position of the object, for example an overtaking vehicle. However, the optical sensor may also be any other form of optical sensor that is capable of detecting another vehicle that is passing or coming towards the motor vehicle.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
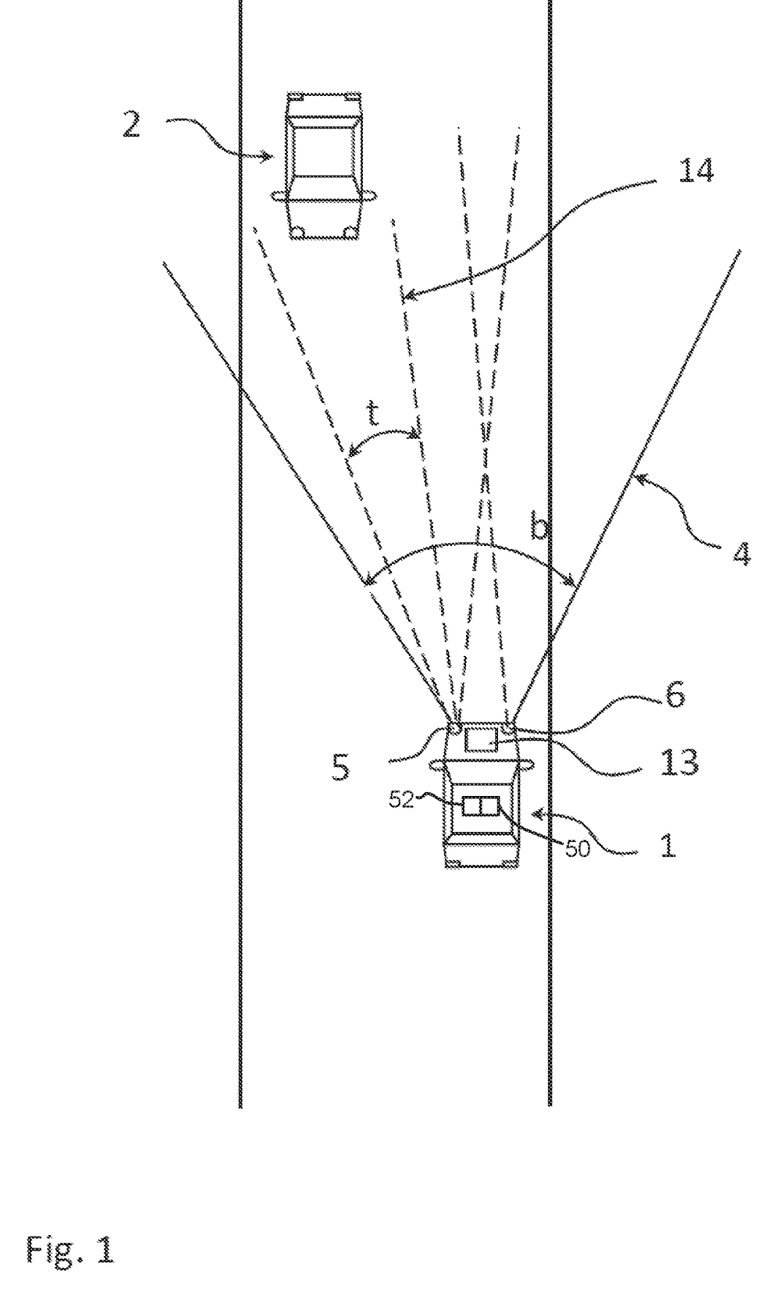
FIG. 1 is a schematic representation of a first driving situation on a straight road to explain the present disclosure.

FIG. 1 is a schematic representation of a first driving situation on a straight road to explain the present disclosure. The figure shows a motor vehicle 1 driving on a straight section of road and a motor vehicle 2 driving in the opposite direction to motor vehicle 1. Motor vehicle 1 has a left headlamp 5 and a right headlamp 6. In this example, headlamps 5 and 6 of motor vehicle 1 are LED matrix headlamps with individually actuatable matrix segments. Headlamps 5 and 6 have a main beam distribution that is represented in FIG. 1 by a light cone 4. Light cone 4 of the main beam emitted by the LED matrix headlamps of motor vehicle 1 is represented schematically by two solid lines with an opening angle b. Opening angle b corresponds to a full, maximum main beam width of headlamps 5 and 6.

Motor vehicle 1 is equipped with an environmental sensor in the form of a camera 13 in the front area thereof for detecting its surroundings. Motor vehicle 1 is also equipped with a GFHB automatic headlamp system (or automatic dimming system) 50, so that a control device (or unit) 52 can deactivate and activate the LED matrix segments of headlamps 5 and 6 in response to the driving situation detected by camera 13.

Light cone 4 has a "suppression tunnel" of GFHB tunnel 14 with a width t, in which the main beam is suppressed to avoid dazzling oncoming traffic.

Figure 2:
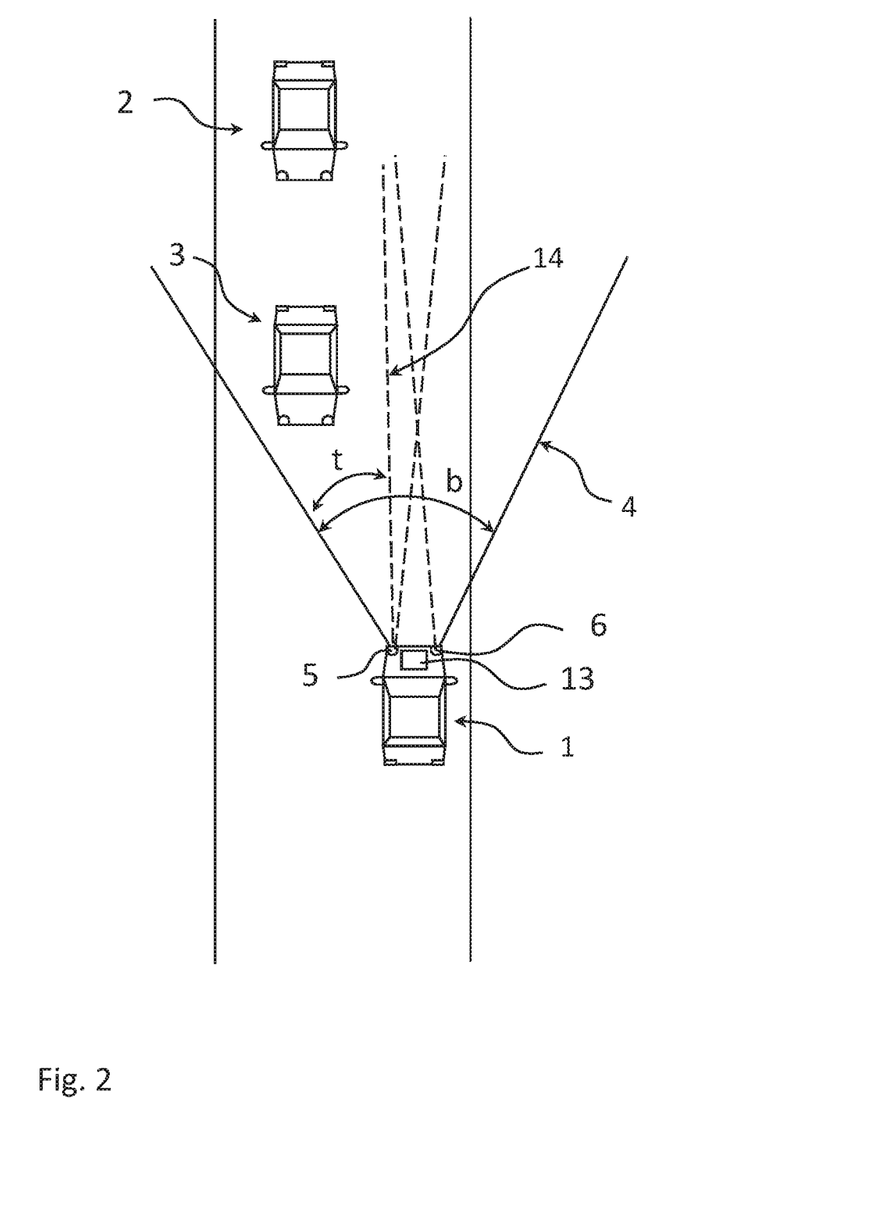
FIG. 2 is a schematic representation of a second driving situation on a straight road to explain the present disclosure.

FIG. 2 is a schematic representation of a second driving situation on a straight road to explain the present disclosure. Two motor vehicles 2 and 3 are shown travelling in the opposite direction to motor vehicle 1. The GFHB automatic system responds to this driving situation in such manner as to avoid dazzling both motor vehicles 2 and 3. In the example, this is assured by suppression of a wider GFHB tunnel, so that both motor vehicles 2 and 3 in the oncoming carriageway fall within the GFHB tunnel fallen and are not dazzled.

The maximum main beam width of headlamps 5 and 6 is defined by opening angle b. The main beam distribution has been modified asymmetrically by the automatic dimming system in such manner that essentially only the left side of the light distribution from LED matrix headlamps 5 is restricted by deactivation of corresponding segments of the LED matrix headlamps. The right side of the light distribution remains largely equivalent to the main beam distribution of FIG. 1, which is largely unrestricted and undimmed by the process, so that the full light performance is retained in the right part of the light distribution.

Objects on the left side of the road (oncoming traffic) change rapidly. The bright lights of headlamps from oncoming traffic make the grid effects of the matrix pattern—on the left edge of the tunnel—less evident for the driver. A coarse grid effect on the left is thus not usually noticed by the driver. On the other hand, because the tail lights of traffic travelling ahead and in the same direction relatively dim and moving more slowly, they require higher resolution to ensure that the headlamp functionality is substantially unaffected by the GFHB automatic system. Details that are important for the driver and which should be illuminated by the LED matrix are more likely to take place on the right side and in the middle, where higher resolution is required anyway.

Figure 3:
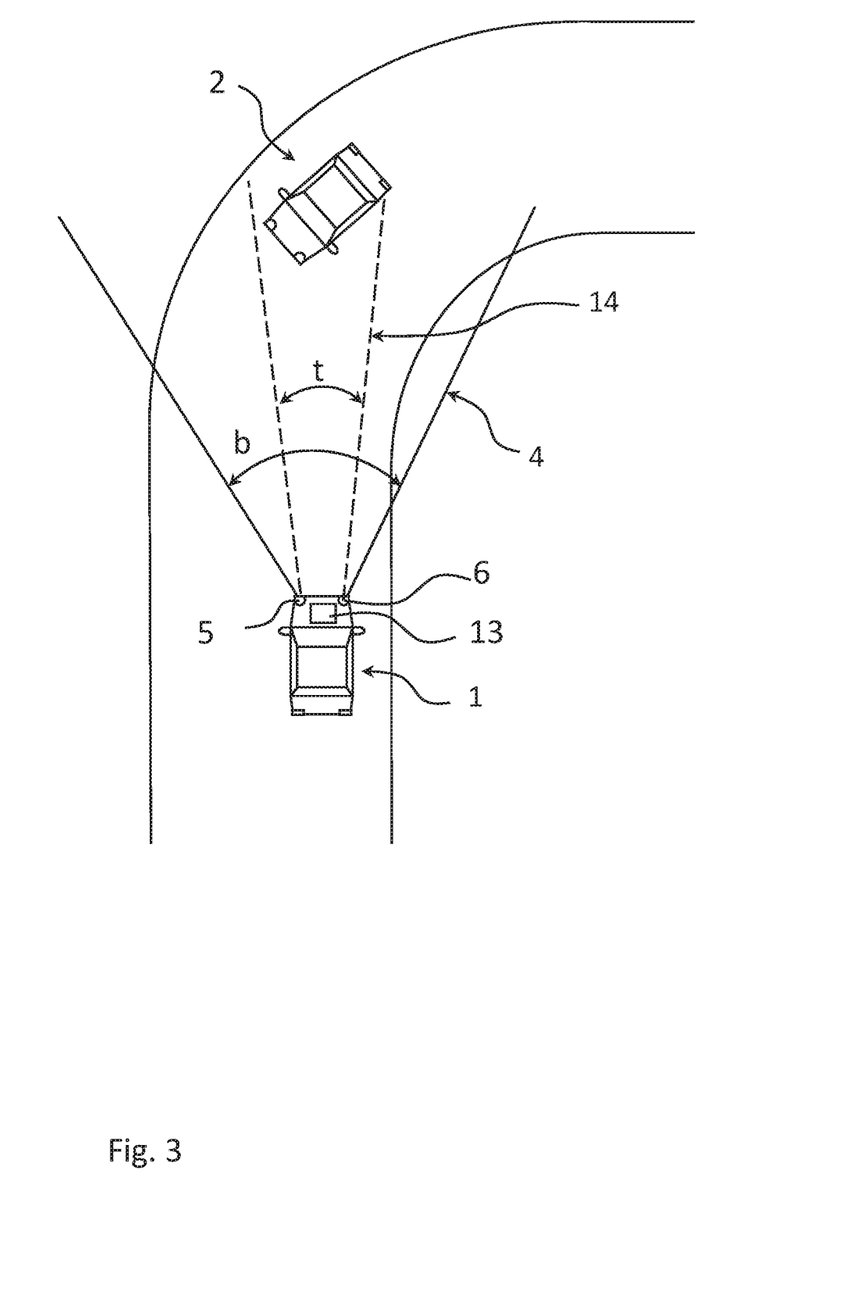
FIG. 3 is a schematic representation of a driving situation on a bend in the road to explain the present disclosure.

FIG. 3 is a schematic representation of the automatic dimming system of FIG. 1 on a bend in the road. In the driving situation shown in FIG. 3, a motor vehicle 2 driving towards motor vehicle 1 is positioned roughly in the middle region of the main beam cone 4 of motor vehicle 1. In the situation shown, segments of both the left headlamp 5 and the right headlamp 6 are actuated by the automatic dimming system in such manner that motor vehicle 2 falls within the GFHB tunnel with an opening angle t, and the driver of motor vehicle 2 is not dazzled. To achieve this effect, the corresponding segments of headlamps 5 and 6 are dimmed or switched off.

In order to avoid dazzling oncoming traffic, the GFHB automatic system substantially restricts the left side of the main beam distribution, which is typically the side of where more frequent switching activity of the individual segments of the matrix headlamps is observed, so that the region or GFHB tunnel width that is not used for lighting is more often on the left side of the main beam distribution. This means that the matrix segments of the left headlamp are switched off considerably more often than the matrix segments of the right headlamp. This difference in the perception of the driver of motor vehicle 1 of the speed of objects in different regions of the lighting cone makes it possible to optimize the performance of the headlamp system with an asymmetrical headlamp configuration corresponding to this difference.

As may be seen from FIG. 1 to 3, the GFHB tunnel is created on the left side and in the middle of the main beam distribution more often than on the right side. This means that segments on the right side remain switched on more often than those on the left side and in the middle of the main beam distribution. On the other hand, the outer right region of the main beam distribution is largely unaffected by the automatic dimming system.

Figure 4:
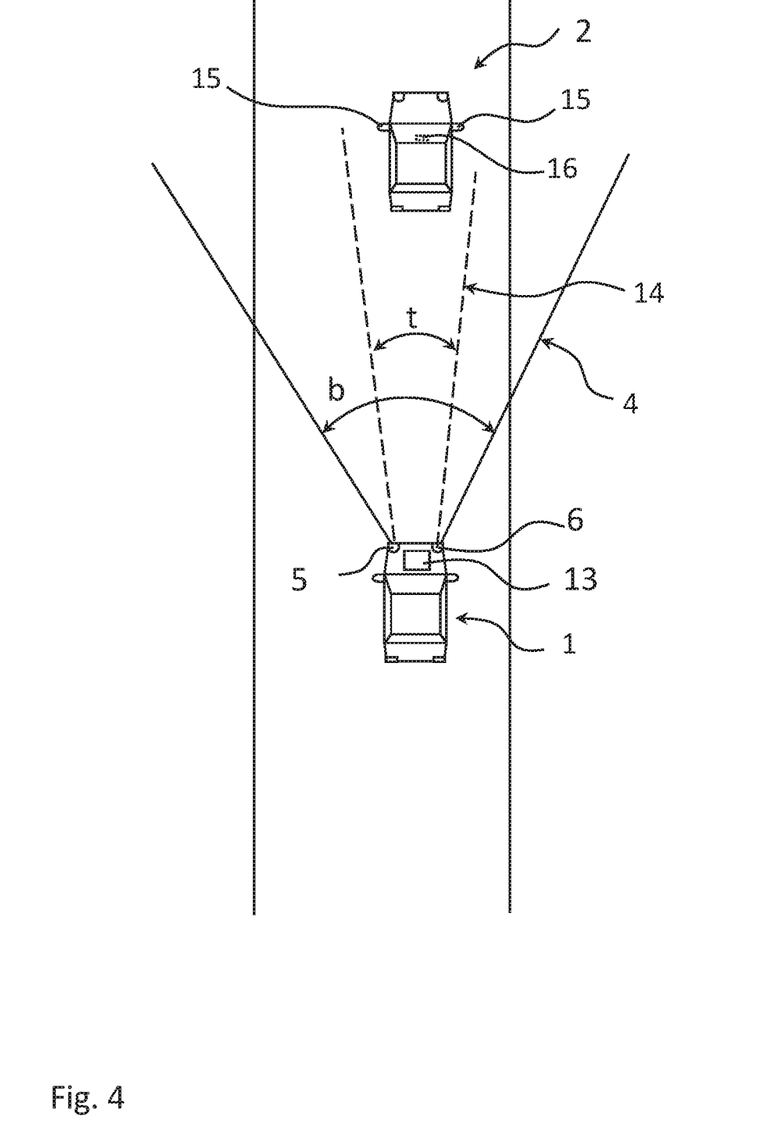
FIG. 4 is a schematic representation of a driving situation with traffic ahead, travelling in the same direction on a straight road.

FIG. 4 is a schematic representation of a driving situation with traffic ahead, travelling in the same direction on a straight road. With traffic ahead travelling in the same direction, the risk of "mirror glare" exists. In this case, the traffic ahead is represented by motor vehicle 2. Motor vehicle 2 has a rearview mirror 16 and two wing mirrors. In order to prevent headlamps 5 and 6 of the motor vehicle from dazzling the driver of motor vehicle 2 via the wing mirrors 15 and rearview mirror 16, the automatic dimming system deactivates the main beam in the middle region of the main beam distribution, thereby creating a GFHB tunnel 14 having width t in the middle region of the main beam distribution.

Instead of the wide GFHB tunnel shown in FIG. 4, it is also possible to avoid dazzling traffic ahead by creating two or more narrow GFHB tunnels which prevent glare in the rearview mirrors of the vehicles ahead.

As is illustrated in FIGS. 1 to 4, the positions of objects on the left side—in this case motor vehicles 2 and 3—often change very rapidly from the perspective of the driver of motor vehicle 1. Consequently, the requirements for spatial resolution of the lighting on the right side are higher, since changes in the positions of various objects take place relatively slowly, so the distracting grid effect of the main beam is more noticeable. Such changes may relate to the position of a vehicle ahead travelling in the same direction and objects on the right side of the road.

Figure 5:
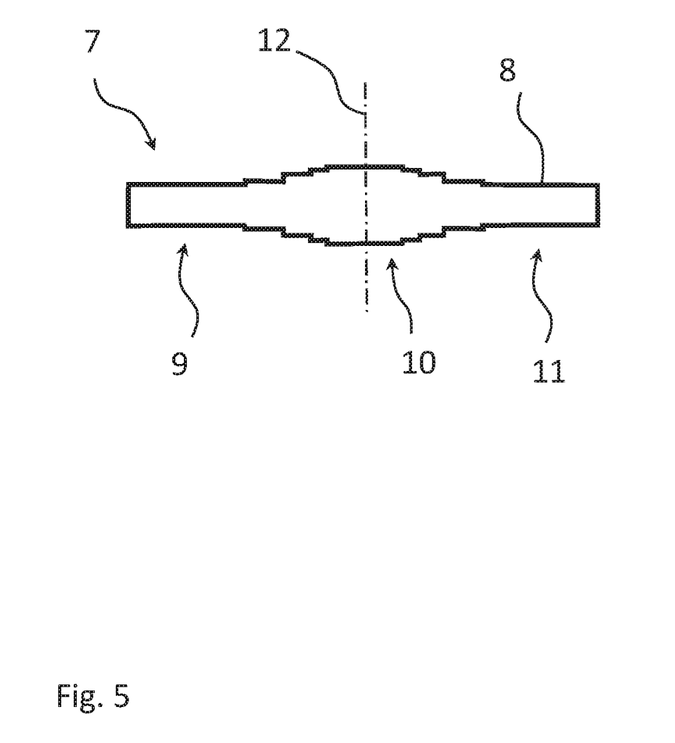
FIG. 5 is a schematic representation of a main beam distribution of a headlamp system according to a first embodiment of the present disclosure.

FIG. 5 is a schematic representation of a main beam distribution of a headlamp system according to a first embodiment of the present disclosure. The light distribution 7 corresponds to a light intensity distribution of the main beam on a vertical white wall at a distance of about 25 m in front of the GFHB matrix headlamp system. Light distribution 7 has a middle region 10 and an outer left region 9 and an outer right region 11. Light distribution 7 has a light distribution contour 8 with axial symmetry about a vertical axis of symmetry 12.

Figure 6:
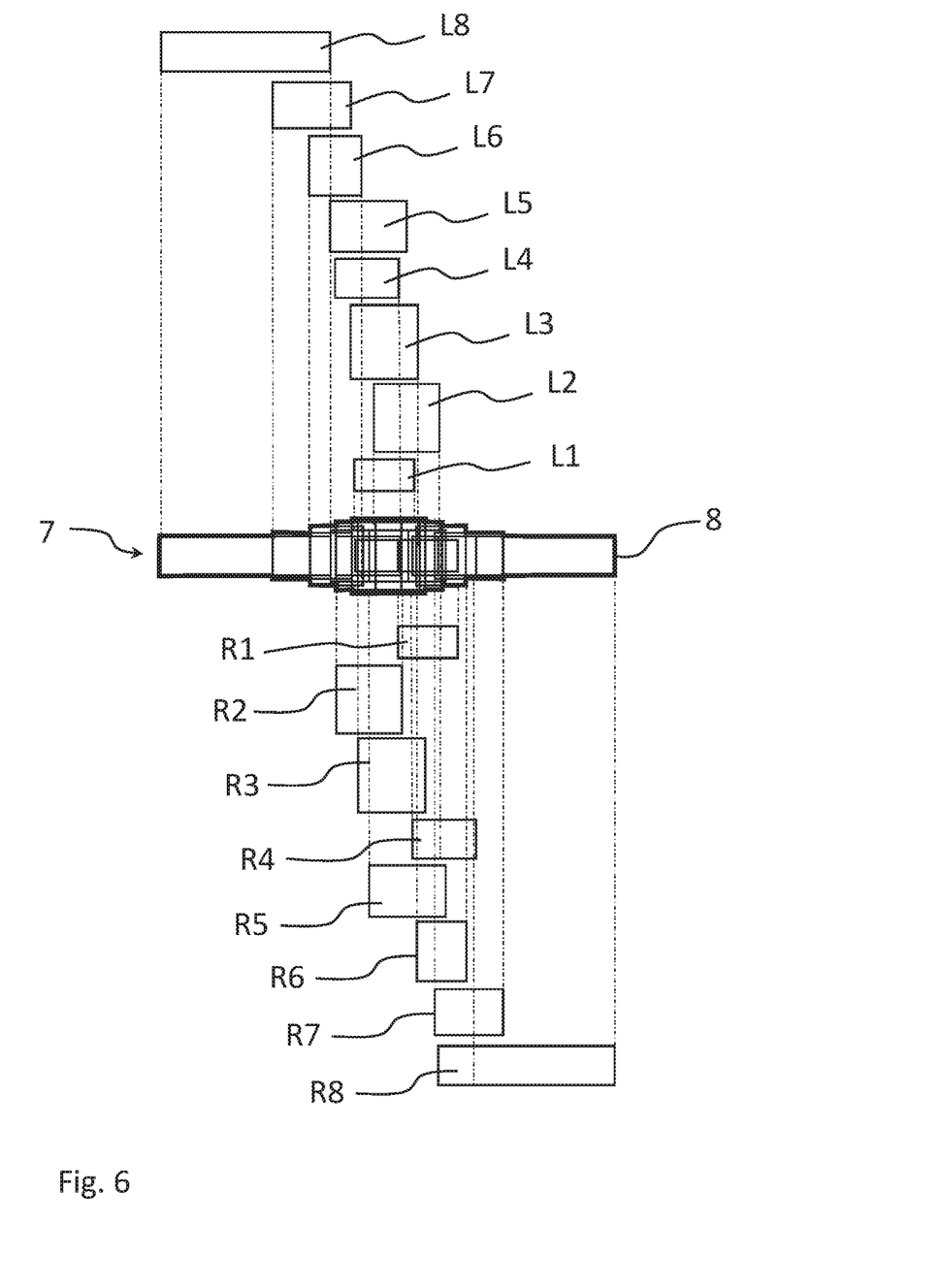
FIG. 6 is a schematic representation of the composition of the light distribution contour of FIG. 4 in the case of a LED matrix headlamp system with asymmetrical segment arrangement.

FIG. 6 is a schematic representation of the composition of the light distribution of FIG. 5 in the case of a LED matrix headlamp system with a left and a right headlamp. FIG. 6 illustrates the creation of the symmetrical light distribution contour of FIG. 4 from an asymmetrical arrangement of the headlamp segments. In this example, the left headlamp has eight individually actuatable LED matrix segments. A corresponding light distribution region L1 to L8 may be allocated to each of these segments. The right headlamp also has eight individually actuatable LED matrix segments, to each of which a corresponding light distribution region R1 to R8 may be allocated. Regions L1 to L8 and R1 to R8 are represented as being stacked vertically one above the other to show that light distribution 7 is constituted by overlapping the light distributions of individual segments of the headlamps. In the middle region 10 of main beam distribution 7, the two headlamp distributions overlap each other. Outer regions 9 and 11 are each substantially served by only one headlamp.

Main beam segment regions L1 to L8 and R1 and R8 of headlamps 5 and 6 are in a partly asymmetrical arrangement, so that some main beam regions of the left and right headlamps are not aligned symmetrically with respect to vertical axis 12. Despite this asymmetry in the arrangement of some segments of the left relative to the corresponding segments of the right headlamp, for example L1 compared with R1 or L4 compared with R4, a symmetrical light distribution contour 8 is created. Light distribution contour 8 thus remains symmetrical, while the shifts take place mainly in middle region 10. Overall, this serves to improve the light quality in the sense of finer resolution and smoother contours on the right side.

Figure 7:
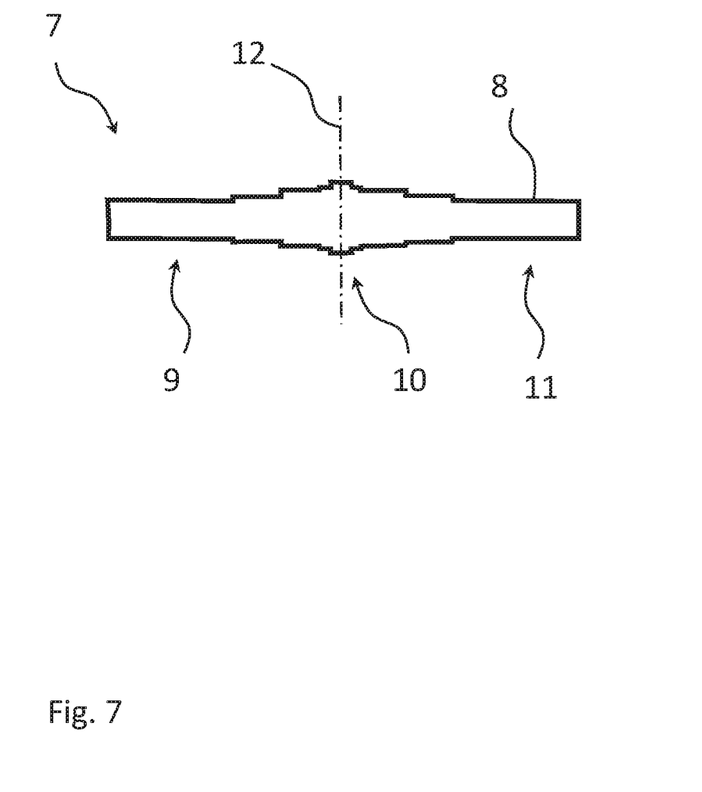
FIG. 7 is a schematic representation of a main beam distribution of a headlamp system according to a second embodiment of the present disclosure.

FIG. 7 is a schematic representation of a light distribution of a headlamp system according to a second embodiment of the present disclosure. Main beam distribution 7 in FIG. 7 is still mirror-symmetrical, but unlike the embodiment of FIGS. 5 and 6 it is created by a different combination of matrix segments.

Figure 8:
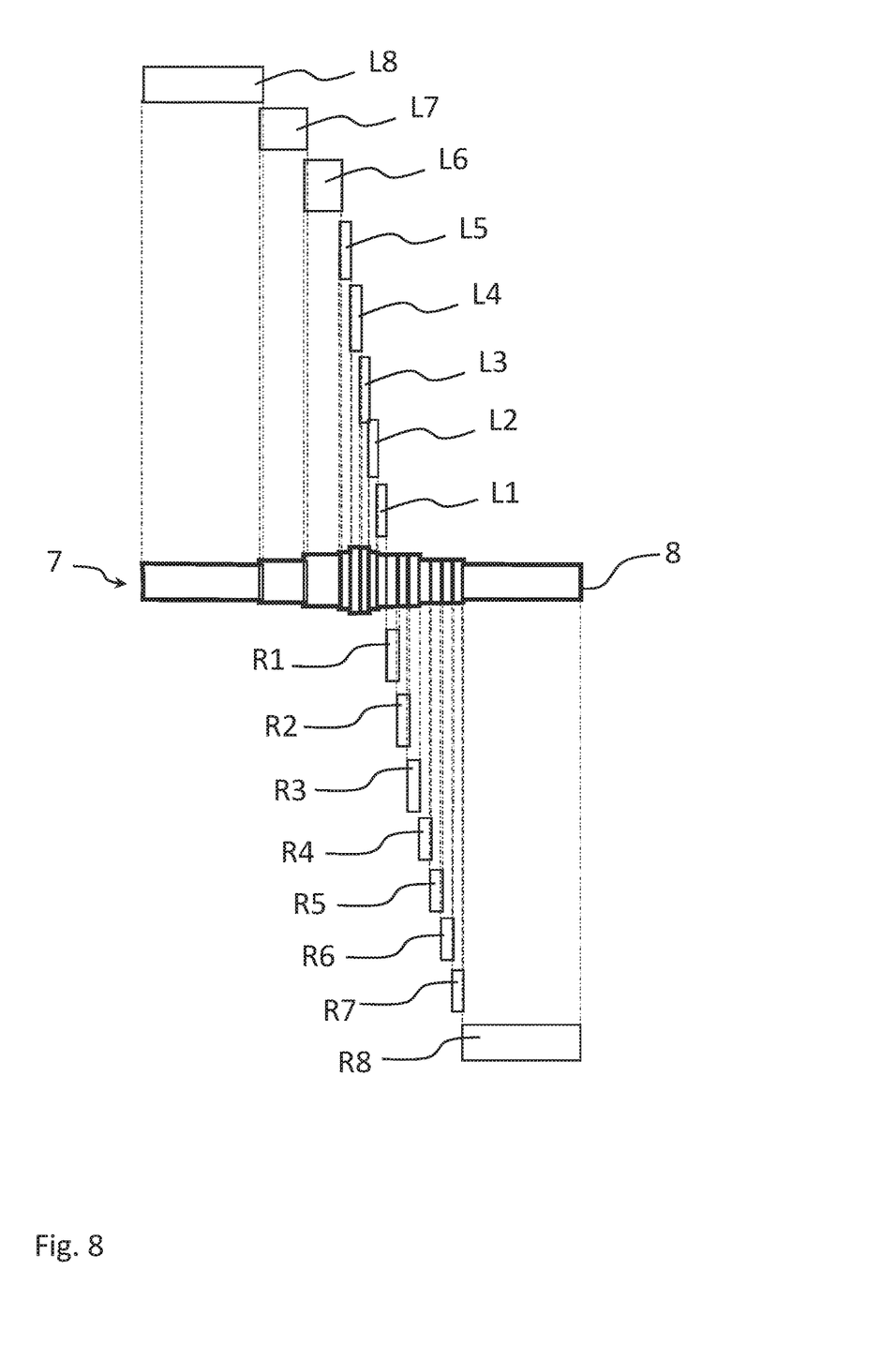
FIG. 8 is a schematic representation of the composition of the light distribution contour of FIG. 6 in the case of a LED matrix headlamp system with asymmetrical segment arrangement according to the second embodiment of the present disclosure.

FIG. 8 is a schematic representation of the composition of the light distribution contour of FIG. 7 in the case of a LED matrix headlamp system with asymmetrical segment arrangement according to the second embodiment of the present disclosure. Main beam distribution 7 has narrower main beam segment regions and higher resolution in the outer right region and the middle. The portion of the LED matrix in the left headlamp that is involved in the main beam distribution 7—corresponding to main beam segment regions L1 to L8—is not in mirror symmetry with the portion of the LED matrix in the right headlamp, corresponding to sub-regions R1 to R8. However, the overlap of the two light distributions combines in total for form a symmetrical main beam distribution with the advantage of high resolution in the middle and on the right side. As may be seen in FIG. 8, adjacent main beam segment regions partly overlap each other. This overlap of adjacent main beam segment regions serves to smooth the main beam distribution and reduce the effects of any manufacturing tolerances in the adjacent LED matrix segments.

Of course, although the examples described here and in the figures refer to vehicles which are driven on the right side of the road, they are equally applicable in vehicles for driving on the left with appropriate adaptation and mirror-reversed illustration.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A headlamp device for a motor vehicle comprising a segmented light source, which has individually deactivatable light source segments for generating a glare-free main beam with the aid of an automatic dimming system and is configured such that at least one region in the main beam distribution of the headlamp device can be suppressed selectively by deactivating the individual light source segments, and that each light source segment in an activated state lights up a main beam segment region with a respectively preset width in the main beam distribution of the headlamp, wherein the width of the main beam segment region is preset in the main beam segment region depending on an expected average dynamic of objects to avoid dazzling under normal traffic conditions, wherein the headlamp device comprises a first headlamp with a first light source segmentation inclined towards the oncoming carriageway and a first main beam segmentation, and a second headlamp inclined away from the oncoming carriageway with a second light source segmentation and a second main beam segmentation asymmetrical with the first main beam segmentation.

2. The headlamp device according to claim 1, wherein the headlamp device is configured such that the main beam segment regions in which a higher average dynamic of objects to avoid dazzling from the perspective of the motor vehicle driver is to be expected in real traffic conditions are wider on average than the main beam segment regions for which a lower average dynamic of objects to avoid dazzling from the perspective of the motor vehicle driver is to be expected in real traffic conditions.

3. The headlamp device according to claim 1, wherein the headlamp device is configured such that a main beam distribution is created that is substantially mirror-symmetrical about a central axis when all light source segments of the first and second headlamps are activated.

4. The headlamp device according to claim 3, wherein the main beam distribution on the half directed away for the oncoming carriageway has more main beam segment regions than the half directed toward the oncoming carriageway.

5. The headlamp device according to claim 3, wherein the main beam distribution comprises a first outer region directed at the oncoming carriageway, a second outer region directed away from the oncoming carriageway and a middle region, wherein the main beam in the middle region of the main beam distribution is produced substantially by the first headlamp.

6. The headlamp device according to claim 3, wherein the first headlamp and the second headlamp have the same number of light source segments.

7. The headlamp device according to claim 3, wherein the first and second headlamps viewed from the front present a substantially mirror-symmetrical construction about a center line extending vertically between the first and second headlamps.

8. The headlamp device according to claim 3, wherein at least one of the first and second headlamps is equipped with a dummy light source segment.

9. The headlamp device according to claim 1, wherein the headlamp device is configured such that wider main beam segment regions are located substantially in outer regions of the main beam distribution.

10. The headlamp device according to claim 1, wherein adjacent main beam segment regions partly overlap each other.

11. The headlamp device according to acclaim 1, wherein the light source segments are deactivated by switching them off.

12. The headlamp device according to acclaim 1, wherein the light source segments are deactivated by dimming them to below a lighting threshold.

13. The headlamp device according to claim 1, wherein the light source segments comprise semiconductor light sources.

14. The headlamp device according to claim 13, wherein each of the semiconductor light source is selected from the group consisting of an LED and a semi-conductor laser.

15. The headlamp device according to claim 13, wherein the semiconductor light sources form an LED matrix headlamp having the light source segments configured as LED matrix segments.

16. A motor vehicle comprising a headlamp device according to claim 1 and further comprising a sensor device having at least one sensor configured to detect a current driving situation, and a control unit configured to suppress the main beam selectively in response to the current driving situation.

17. The motor vehicle according to claim 16, wherein the current driving situation presents a risk of dazzling other road users is detected.

18. A headlamp device for a motor vehicle comprising a segmented light source, which has individually deactivatable light source segments for generating a glare-free main beam with the aid of an automatic dimming system and is configured such that at least one region in the main beam distribution of the headlamp device can be suppressed selectively by deactivating the individual light source segments, and that each light source segment in an activated state lights up a main beam segment region with a respectively preset width in the main beam distribution of the headlamp, wherein the width of the main beam segment region is preset in the main beam segment region depending on an expected average dynamic of objects to avoid dazzling under normal traffic conditions,     wherein the light source segments are deactivated by dimming them to below a lighting threshold.

\* \* \* \* \*